Dec. 3, 1929.  C. H. EHLERS  1,737,835
FLOW DETECTING SYSTEM
Filed Aug. 10, 1925  2 Sheets-Sheet 1
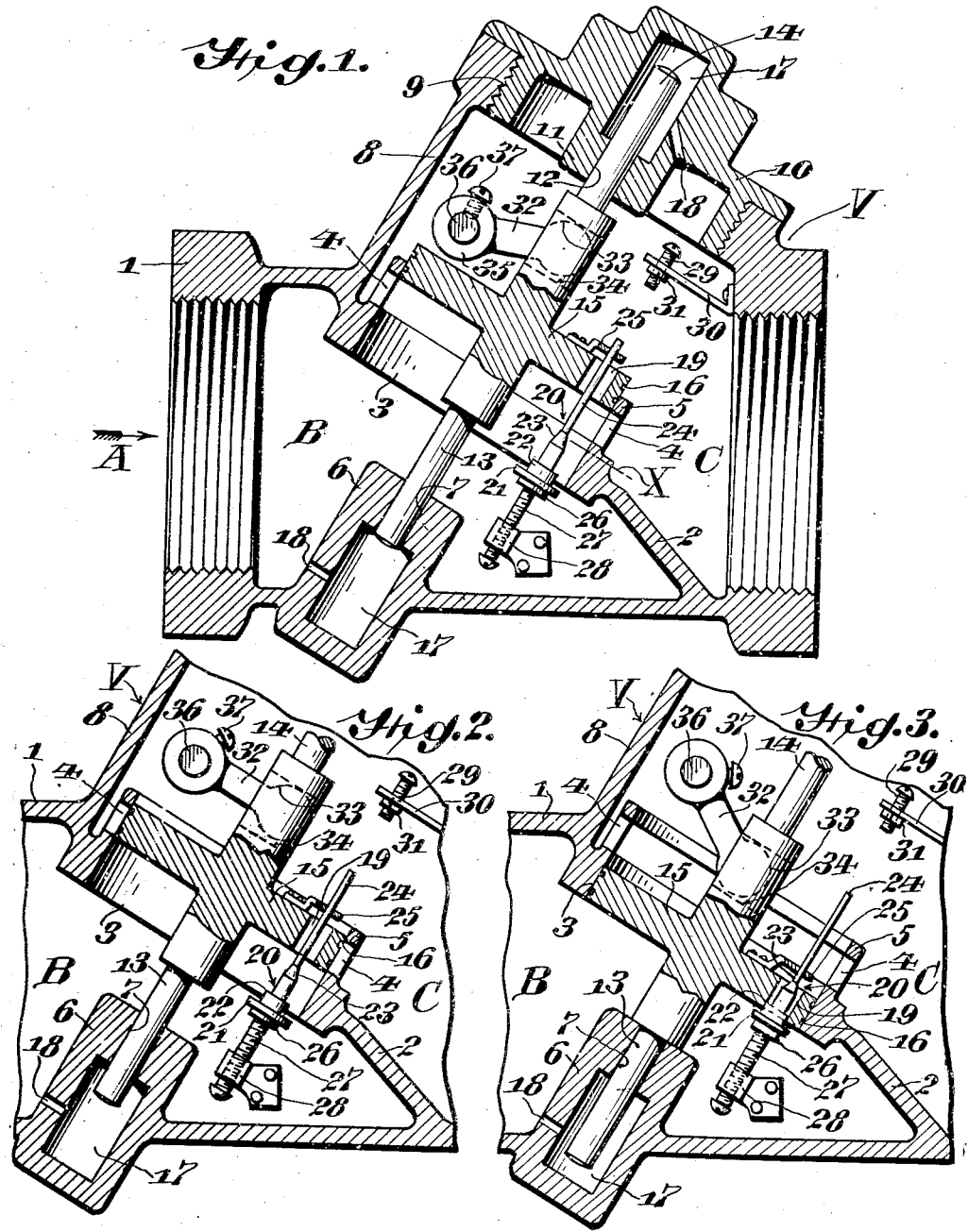
INVENTOR.
Carl H. Ehlers,
BY
Cornelius L. Ehret
ATTORNEY.

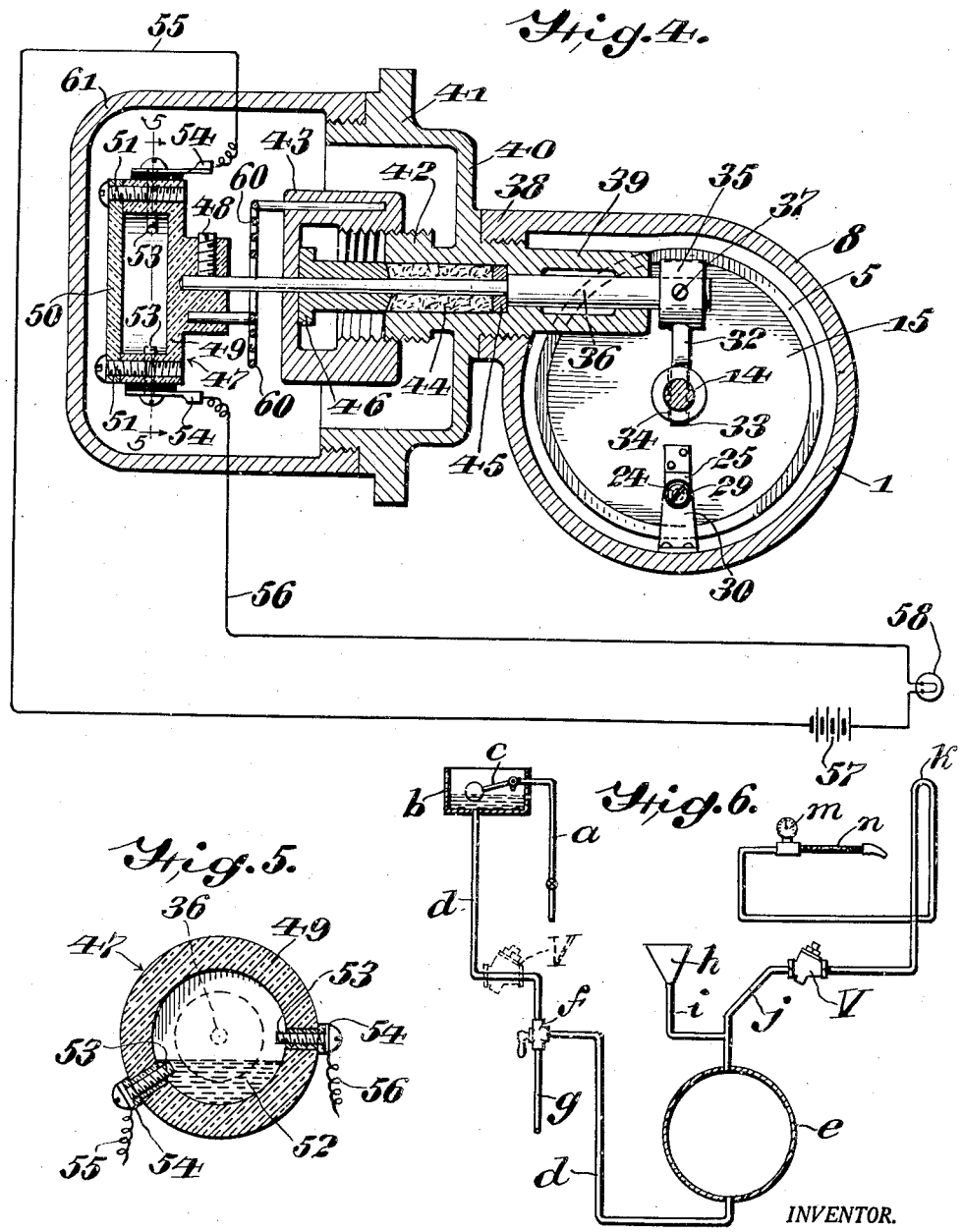

Patented Dec. 3, 1929

1,737,835

UNITED STATES PATENT OFFICE

CARL H. EHLERS, OF PENFIELD, PENNSYLVANIA, ASSIGNOR TO THE ATLANTIC REFINING COMPANY, OF PHILADELPHIA, PENNSYLVANIA, A CORPORATION OF PENNSYLVANIA

FLOW-DETECTING SYSTEM

Application filed August 10, 1925. Serial No. 49,478.

My invention relates to a system and apparatus for controlling suitable signal or indicating apparatus in response to the development of an abnormal condition in a system of pipes or conduits traversed by a fluid.

In accordance with my invention, suitable apparatus is utilized to actuate signal or indicating apparatus, as aforesaid, in response to the passage of a liquid or a gaseous substance through a pipe or conduit, as aforesaid.

Further in accordance with my invention, a valve, or equivalent structure, is interposed in the path of a fluid passing through a pipe to a point of withdrawal, and is utilized to actuate a signal whenever fluid is flowing.

Further in accordance with my invention, a valve, as aforesaid, normally closing the fluid path through a pipe and automatically opening the path when by withdrawing fluid the pressure on one side thereof is reduced, is equipped with supplementary mechanism to the end that the valve may move to its normal closing position when fluid is no longer withdrawn.

My invention resides in a system and apparatus of the character hereinafter described and claimed.

For an illustration of one of the forms my invention may take, reference is to be had to the accompanying drawing, in which:

Fig. 1 is a vertical sectional view of a valve constructed in accordance with my invention.

Fig. 2 is a vertical sectional view corresponding to Fig. 1 with various parts in another position.

Fig. 3 is a vertical sectional view corresponding to Fig. 1, with various parts in still another position.

Fig. 4 is a horizontal sectional view showing the circuit controlling mechanism.

Fig. 5 is a vertical sectional view taken on the line 5—5 of Fig. 4, looking in the direction of the arrows.

Fig. 6 is a diagrammatic view illustrating an oil-dispensing system utilizing structure constructed in accordance with my invention.

Referring to Fig. 6 of the drawing, there is illustrated an oil- or gasoline-dispensing system comprising a water supply pipe $a$, a tank $b$, and a float valve $c$ controlling admission of water from pipe $a$ as the water level in tank $b$ falls in response to delivery of water along the pipe $d$ to the tank $e$. Interposed in the pipe $d$ is a three-way valve $f$ communicating with a drain or waste pipe $g$. Liquid is passed to tank $e$ through a funnel $h$ and a pipe $i$, and is withdrawn therefrom through a pipe $j$ having a return bend $k$ in a region higher than the tank $b$. Pipe $j$ terminates at a meter $m$ provided with a hose and nozzle $n$.

The arrangement described above is old and well-known in the art. Briefly stated, the operation is as follows:

When it becomes necessary to replenish tank $e$ with a supply of oil, three-way valve $f$ is turned to shut off the flow of water through the upper part of pipe $d$ and establish communication between the lower part of pipe $d$ and the waste pipe $g$. Thereupon, the water in the system escapes through pipe $g$ until it reaches the level of the three-way valve $f$. A quantity of oil now introduced into tank $e$ through funnel $h$ and pipe $i$ displaces an equal quantity of water, and forces the same from the tank through the lower part of pipe $d$ and waste pipe $g$. When the desired quantity of oil has been introduced, pipe $i$ is suitably closed, and the three-way valve $f$ is actuated to close the passage through pipe $g$ and reestablish the water path through pipe $d$. In this manner, the oil in tank $e$ is placed under pressure by the head of water extending upwardly as high as the tank $b$, and consequently, flows through pipe $j$ when the meter $m$ is opened. However, since the bend $k$ in pipe $j$ is higher than tank $b$, passage of water to the meter $m$ is rendered impossible.

In so far as possible, it is desirable that the pipe comprised in systems of the character illustrated in Fig. 6 be buried in the ground. In so doing, however, the pipe, or a large portion thereof, is hidden from view, and, accordingly, the detection of a leak has been rendered practically impossible. Particularly, this has been true where but a small amount of liquid was escaping.

Should an opening develop in some portion of the pipe *j* (Fig. 6), oil will pass from tank *e* through the pipe and escape into the ground through such opening. At the same time, water will pass through pipe *d* into tank *e*. Accordingly, in accordance with my invention, any passage of liquid through the pipes aforesaid is utilized to actuate suitable flow detecting apparatus, in turn actuating a prominently displayed signal of desired character. It is to be observed that customary withdrawal of oil through the meter *m* will also actuate the signal aforesaid. However, should the signal remain actuated at a time when meter *m* is not open, there is but one explanation, namely, that oil is passing through some part of the pipe system and escaping in some manner. Under such circumstances, repair measures may be promptly instituted.

Flow-detecting apparatus, as above, may be inserted in the pipe system where desired. As shown, such apparatus comprises the valve V, or equivalent, connected in pipe *j*, preferably adjacent tank *e*. Another position, as indicated by the dotted lines (Fig. 6), is in the pipe *d*, preferably adjacent tank *b*.

Referring now to Fig. 1, valve V is illustrated as comprising a valve body 1, divided into an inlet port B and a discharge port C by a dividing wall member 2, formed integrally with the valve body and extending thereacross preferably at an angle of approximately 45 degrees with the longitudinal axis of said valve body. Liquid entering the inlet port B in the direction of the arrow A may pass to the discharge port C through an annular opening 3 in the wall member 2, and a plurality of ports 4 in a collar 5 extending laterally from the wall member 2 and having an internal diameter corresponding to that of the opening 3.

The valve body 1 comprises a guide member 6 having an opening 7 and an angular extension 8 threaded interiorly at 9 to receive a cap 10 forming a second guide member 11 having an opening 12. Openings 7 and 12 are so arranged that a line extending centrally and longitudinally thereof passes parallel to the peripheral wall of said opening 3 and coincides with the center thereof.

Stems 13 and 14, slidable, respectively, in the openings 7 and 12, support a piston 15 movable from a position above the ports 4 (Fig. 1) to a position in and closing the opening 3 (Fig. 3). Piston 15 may be provided with one or more annular grooves 16 receiving and temporarily retaining a supply of the liquid passing through the valve. As the piston moves along the wall of opening 3, the thin film of the liquid acts as a seal and also decreases the friction between the parts.

To the end that the friction may be still further reduced, stems 13 and 14 are extended into chambers 17, formed, respectively, in the guide members 7 and 11. Vents 18 function to relieve the air pressure in said chambers.

Piston 15 is provided with a circular opening 19, closed at times, as hereinafter described, by a supplementary valve member 20 comprising a circular portion 21 having a diameter substantially exceeding that of the opening 19, a second circular portion 22 having a diameter corresponding to that of the opening 19, an angular reduced portion 23, and a guide shank 24 of relatively small diameter. Valve member 15 carries a guide member 25 having an opening corresponding in size with and receiving shank 24.

Movement of valve member 20 in one direction is restrained by a stop member 26 suitably secured to the valve body 1, while movement of said member in the opposite direction is limited by a stop screw 29 adjustable in a bracket 30 also carried by the main valve body 1. If desired, stop screw 29 may be held in adjusted position, as by the lock nut 31.

Reciprocatory movement of piston 15 is utilized to oscillate an arm 32 suitably connected thereto, as by extending an enlarged portion 33 of said arm into a slot 34 in the upper portion of the piston. A collar 35 on the other end of arm 32 fits over a shaft 36, and a lock screw 37, or equivalent, secures said collar to shaft 36.

Referring to Fig. 4, the valve body 1 is shown as comprising a tangentially extending member 38 receiving in its open end a bearing 39 for the shaft 36, aforesaid. A flange 40 of the bearing 39 abutting against the wall of member 38 is extended laterally to form a stuffing box 41.

The bearing 39 also comprises a collar 42 threaded exteriorly to receive a follower nut 43, and the shaft 36, preferably reduced in diameter, extends through said collar and an opening in the follower nut. To prevent escape of liquid from the valve body 1, suitable packing 44 is disposed in the collar 42 around the reduced portion of shaft 36 between a stuffing box washer 45 abutting against the flanged end of shaft 36 and a gland 46 engaging the follower nut 43. Accordingly, by advancing the latter element along collar 42, gland 46 will be moved to compress the packing 44.

From the foregoing, it will be apparent that oscillatory movement of shaft 36 is effected only in response to reciprocatory movement of piston 15. Accordingly, the position of piston 15, whether in or out of opening 3, may be determined by observing the position of shaft 36, or, more desirably, by controlling suitable indicating mechanism in response to movement of the shaft 36. To this end and as one manner of so doing, a suitable make-and-break switch, as the mercury switch 47, may be secured to the free end of shaft 36 by a set screw 48. Preferably, switch 47 comprises a cylindrical casing 47 having a cover 50 secured thereto in any desired manner, as by the screws 51. The casing and cover are both formed of suitable insulating material, and enclose a pool of mercury 52, or equivalent. Two conductive terminals 53 extend through the wall of the casing from points within, and each terminal exteriorly of the casing carries a lug 54 included in an electric circuit comprising the conductors 55 and 56, a source of current 57, and a lamp 58, or equivalent signaling device.

Under some circumstances, it may be desirable to apply a biasing force to the mercury switch 47 tending to rotate the switch to open the circuit through lamp 58 and to assist the action of gravity on the piston 15. To this end, the ends of a spiral spring 60 may be secured, respectively, to the switch 47 and follower nut 43.

Preferably, as a protective measure, a cap 61 is applied to the stuffing box 41.

The operation is as follows:

Initially, it is to be understood that the mercury switch 47 is so positioned on the shaft 36 that upon upward movement of valve 15 just sufficient to permit passage of liquid through the annular opening 3, shaft 36, through the arm 32, will have rotated an amount just sufficient to immerse both contacts 53 of the mercury switch 47 in the pool of mercury 52, thereby closing the circuit through the signal lamp 58. During continued upward movement of piston 15 from this point, the circuit remains unchanged and the light remains lighted, and it is not until the piston descends an amount sufficient to entirely close the opening 3 that shaft 36 is rotated sufficiently in reverse direction to open the circuit of lamp 58 in the mercury contact switch 47.

Under stable conditions, such as exist when the outlet of hose $n$ is closed and with no leak in the pipe system, piston 15 lies at some point entirely within the circular opening 3, for example, as shown in Fig. 3, and lamp 58 is unlighted. During such a period, the fluid pressure in the inlet port B balances that in the discharge port C, and piston 15 remains stationary.

However, upon passage of liquid through the pipe connected to the discharge port C, the fluid pressure in said port is diminished, and upward movement of piston 15 out of opening 3 immediately ensues. If a relatively large amount of the liquid is escaping, the decrease in pressure in discharge port C will be marked, and the piston 15, in endeavoring to compensate for the change in pressure, will move higher and higher.

When the flow of liquid from the pipe connected to discharge port C ceases, piston 15 under the influence of gravity starts, and continues its descending movement. During this period the pressures in the two chambers are in the process of equalization, that is, liquid is flowing from chamber B to chamber C. In practice it has been found that this descending movement invariably terminates in substantially the position indicated in Fig. 2, a position wherein a piston 15 having no valve structure therein has just closed the opening 3 and wherein the slightest upward movement thereof would permit passage of fluid from port B into port C.

Apparatus of the character herein described is capable of detecting very small liquid losses such as occur when piston 15 has moved upwardly only an almost imperceptible distance from that shown in Fig. 2. Obviously, it is impractical to attempt a control of the circuit of lamp 58 such that with piston 15 in the latter position, the lamp is lighted and when only imperceptibly lowered, the lamp is not lighted.

Accordingly, assuming that liquid is not escaping from port C for any reason, piston 15 is so controlled that it will not remain in the position of Fig. 2, but will assume a much lower position. To this end, it is necessary that an amount of liquid be transferred from chamber B to chamber C, and as one way of so doing, I utilize the supplementary leak piston 20 and associated mechanism.

This device operates as follows:

Assuming that piston 15 is in its lowermost position, or substantially so, valve member 20 will be occupying the position shown in Fig. 3, with the annular portions 21 and 22 closing the opening 19. As the piston 15 moves upwardly in response to a deficiency of pressure in the discharge port C caused by withdrawal of liquid, valve member 20 moves therewith, maintaining the opening 19 closed until shank 24 engages stop screw 29. Thereupon, the said member drops onto the stop member 26, where it remains while the piston 15 is in its upper region of travel.

As piston 15 moves down towards its lowest position due to equalization in pressure in B and C, valve 20 which cannot move down due to the set screw 27, enters the small port or opening through piston 15, numbered 19, and closes it off so that no liquid can pass through this opening. Therefore if there is any leakage in the piping connected to and beyond the piece of equipment, there is a drop in pressure on the discharge side, in consequence of which the pressure on the inlet side of the equipment gradually moves piston 15 upwardly, and before said piston reaches the point indicated in Fig. 2, the electric switch indicated in Fig. 4 makes contact or closes the circuit, causing the electric light attached to the circuit to glow.

The difference in pressure on the inlet and outlet side of piston 15 is still sufficient to prevent valve 20 from dropping out of opening 19, making it necessary for the piston to rise up to a point where the leakage will pass out through ports marked 4, there being no other way whereby the liquid can pass through from the high pressure to the low pressure side. However, before it has reached this point, the switch has already made contact, as mentioned above.

If the drop in pressure on the discharge side is due to the opening of a nozzle for service, then, of course, piston 15 will move up further, so that the openings in ports 4 are sufficiently large to supply the necessary liquid passing out through the nozzle. As soon as the nozzle has been closed, the pressure on the outlet side C would be the same as the pressure on the inlet side B, due to the fact that ports 4 are open; in consequence of which valve 20 will drop out of opening 19 due to its own weight. At the same time, piston 15, due to its weight, will start moving downwardly, gradually closing ports 4, and were it not for the opening marked 19, it would stop downward movement as soon as ports 4 were closed, for the reason that the liquid in B could not pass through into chamber C and the pressure in B would immediately become greater than that in C. With 19 open, however, the liquid in B will still continue to pass through into C, maintaining a balance of pressure and allowing piston 15 to continue its movement downwardly until ports 4 have been entirely closed and until valve 20, resting against set screw 27, is pushed into opening 19 by the downward motion of piston 15. Inasmuch as piston 15 is thus caused to assume a substantially lower position than that indicated in Fig. 2, it is possible to adjust the mercury switch 47 on shaft 36 so that the circuit through lamp 58 will not open until the bottom surface of piston 15 has reached some point X (Fig. 1) well within the opening 3. When escape of liquid from port C is entirely prevented, piston 15, due to the supplementary leak piston and associated mechanism, will always move below this point, and extinguish the light, thereby indicating that liquid is not flowing through the valve V. If a leak is present, piston 15 will move upward beyond point X out of the opening 3 an amount depending upon the magnitude of the leak, and, as stated, when in any position beyond said point, lamp 58 is lighted, thereby indicating that for some reason liquid is flowing from the main tank.

Due to the fact that the main piston 15 is considerably more massive than 20, it is of course obvious that movement of piston 15 should be limited by the guide member 6 and not by stop means 27, which would probably be jarred out of adjustment due to repeated impacts of the said moving structure. Accordingly, the stop shoulder on the shaft of piston 15 engages the end of the guide element or bearing 6 before flange 21 of valve 20 is brought into engagement with the lower side of piston 15, but after valve portion 22 has partially entered opening 19 to effectively close the same and to restore the apparatus to its normal inactive position.

Although I have illustrated and described my invention as applied to a system wherein oil or gasoline is dispensed under hydraulic pressure, it is to be understood that my invention is not to be thus limited, since it is readily utilizable in detecting the flow of other fluids, and in connection with pressure systems other than hydraulic systems. For example, my invention may be used in the supply line of a system dispensing a liquid under air pressure.

What I claim is:

1. A system for indicating flow of fluid comprising a member having a port, a piston co-acting with said member to open and close said port, means biasing said piston toward port-closing position, said piston movable in opposition to said biasing means under the influence of fluid pressure to open said port, indication-effecting means movable under the control of said piston and taking a predetermined indicating position when said piston moves in port-closing direction beyond port-closing position, and flow controlling means responsive to movement of said piston from port-opening to port closing position causing said piston to continue its said movement beyond port-closing position.

2. A system for indicating flow of fluid comprising a member having a port, a piston co-acting with said member to open and close said port, means biasing said piston toward port-closing position, said piston movable in opposition to said biasing means under the influence of the fluid pressure to open said port, indication-effecting means movable under the control of said piston and taking a predetermined indicating position when said piston moves in port-closing direction beyond port-closing position, and flow controlling means responsive to movement of said piston from port-opening to port-closing position for transferring fluid past said piston to equalize fluid pressure thereon and cause continued movement thereof beyond port-closing position.

3. A system for indicating flow of fluid comprising a member having a port, a piston co-acting with said member to open and close said port, means biasing said piston toward port-closing position, said piston movable in opposition to said biasing means under the influence of the fluid pressure to open said port, indication-effecting means movable under the control of said piston and taking a predetermined indicating position when said piston moves in port-closing direction beyond port-closing position, and means comprising a valve controlled fluid by-pass for transferring fluid past said piston to cause continued movement thereof beyond port-closing position.

4. A system for indicating flow of fluid comprising a member having a port, a piston co-acting with said member to open and close said port, means biasing said piston toward port-closing position, said piston movable in opposition to said biasing means under the influence of the fluid pressure to open said port, indication-effecting means movable under the control of said piston and taking a predetermined indicating position when said piston moves in port-closing direction beyond port-closing position, means comprising a fluid by-pass for transferring fluid past said piston to equalize pressure thereon and cause continued movement thereof beyond port-closing position, and means for closing said by-pass after said piston has moved beyond port-closing position.

5. A system for indicating flow of fluid comprising a member having a port, a piston co-acting with said member to open and close said port, means biasing said piston toward port-closing position, said piston movable in opposition to said biasing means under the influence of the fluid pressure to open said port, indication-effecting means movable under the control of said piston and taking a predetermined indicating position when said piston moves in port-closing direction beyond port-closing position, means comprising a fluid by-pass for transferring fluid past said piston to cause continued movement thereof beyond port-closing position, and valve means for closing said by-pass after said piston has moved beyond port-closing position.

6. A system for indicating flow of fluid comprising a member having a port, a piston co-acting with said member to open and close said port, means biasing said piston toward port-closing position, said piston movable in opposition to said biasing means under the influence of the fluid pressure to open said port, indication-effecting means movable under the control of said piston and taking a predetermined indicating position when said piston moves in port-closing direction beyond port-closing position, and flow controlling means causing movement of said piston in port-closing direction beyond port-closing position.

7. A system for indicating flow of a fluid comprising a body, a member biased in one direction to a position closing a normal path of fluid through said body and movable under the influence of the fluid pressure in reverse direction to open said path, flow controlling means for effecting further movement of said member in said first named direction, and indicating mechanism actuated by said member upon further movement thereof in said direction.

8. A system for indicating flow of a fluid comprising a body, a member biased in one direction to a position closing a normal path of fluid through said body and movable under the influence of the fluid pressure in reverse direction to open said path, flow controlling means for effecting further movement of said member in said first-named direction, and indicating mechanism comprising a shaft rotatable in response to further movement of said member in said direction.

9. A system for indicating flow of a fluid comprising a body, a member biased in one direction to a position closing a normal path of fluid through said body and movable under the influence of the fluid pressure in reverse direction to open said path, flow controlling means for effecting further movement of said member in said first-named direction, indicating mechanism comprising a shaft rotatable in response to further movement of said member in said direction, and a signal controlled by said shaft.

10. A system for indicating flow of a fluid comprising a body, a member biased in one direction to a position closing a normal path of fluid through said body and movable under the influence of the fluid pressure in reverse direction to open said path, flow controlling means for effecting further movement of said member in said first-named direction, indicating mechanism comprising a shaft rotatable in response to further movement of said member in said direction, and a make-and-break switch actuated by said shaft.

11. A system for indicating flow of a fluid comprising a body, a member biased in one direction to a position closing a normal path of fluid through said body and movable under the influence of the fluid pressure in reverse direction to open said path, flow controlling means for effecting further movement of said member in said first-named direction, indicating mechanism comprising a shaft rotatable in response to further movement of said member in said direction, a make-and-break switch carried by said shaft, and a circuit including a signal controlled by said switch.

12. A system for indicating flow of a fluid comprising a body, a piston biased in one direction to a piston closing a normal path of fluid through said body and movable under the influence of the fluid pressure in reverse direction to open said path, a signal controlled by said piston, and flow controlling means for effecting further movement of said piston in said first-named direction to actuate said signal.

13. A system for indicating flow of a fluid comprising a body, a piston biased in one direction to a position closing a normal path of fluid through said body and movable under the influence of the fluid pressure in reverse direction to open said path, a signal controlled by said piston, and flow controlling means comprising a fluid by-pass through said piston for effecting further movement thereof in said first-named direction to actuate said signal.

14. A system for indicating flow of a fluid comprising a body, a piston biased in one direction to a position closing a normal path of fluid through said body and movable under the influence of the fluid pressure in reverse direction to open said path, a signal controlled by said piston, and means comprising a fluid by-pass through said piston and a valve co-acting therewith for effecting further movement of said first-mentioned piston in said first-named direction to actuate said signal.

15. A system for indicating flow of a fluid comprising a body, a piston biased in one direction to a position closing a normal path of fluid through said body and movable under the influence of the fluid pressure in reverse direction to open said path, a signal controlled by said piston, means comprising a fluid by-pass through said piston and a valve co-acting therewith for effecting further movement of said first-mentioned piston in said first-named direction to actuate said signal, and means for moving said valve for controlling fluid flow through said by-pass.

16. A system for indicating flow of a fluid comprising a body, a piston biased in one direction to a position closing a normal path of fluid through said body and movable under the influence of the fluid pressure in reverse direction to open said path, a signal controlled by said piston, means comprising a fluid by-pass through said piston and a valve co-acting therewith for effecting further movement of said first-mentioned piston in said first-named direction to actuate said signal, and means independent of said piston for closing said valve.

17. A system for indicating flow of a fluid comprising a body, a piston biased in one direction to a position closing a normal path of fluid through said body and movable under the influence of the fluid pressure in reverse direction to open said path, a signal controlled by said piston, means comprising a fluid by-pass through said piston and a valve co-acting therewith for effecting further movement of said first-mentioned piston in said first-named direction to actuate said signal, and adjustable means for closing said valve to effect different limiting positions of said piston.

18. A system for indicating flow of a fluid comprising a housing member having inlet and outlet passages, a member having openings for effecting normal communication between said passages, a piston biased to position closing said openings, said piston adapted to be moved by fluid pressure in opposite direction to a position allowing communication between said inlet and outlet passages, signal controlling means associated with said piston, and valve structure incorporated in said piston for permitting equalization of fluid pressure on opposite sides of said piston, thereby allowing the same to move to a predetermined signal controlling position.

CARL H. EHLERS.